United States Patent
Aoki

(10) Patent No.: US 7,830,563 B2
(45) Date of Patent: Nov. 9, 2010

(54) IMAGE SCANNER AND IMAGE FORMING APPARATUS

(75) Inventor: Minoru Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 904 days.

(21) Appl. No.: 11/616,594

(22) Filed: Dec. 27, 2006

(65) Prior Publication Data

US 2007/0146816 A1 Jun. 28, 2007

(30) Foreign Application Priority Data

Dec. 27, 2005 (JP) ............................. 2005-376702
Nov. 2, 2006 (JP) ............................. 2006-299473

(51) Int. Cl.
*H04N 1/04* (2006.01)

(52) U.S. Cl. ...................... 358/498; 358/448; 358/461; 358/474

(58) Field of Classification Search ................. 358/498, 358/448, 461, 474

See application file for complete search history.

(56) References Cited

U.S. PATENT DOCUMENTS 5,214,470 A * 5/1993 Denber ........................ 355/75

6,295,140 B1 * 9/2001 Kameyama ................. 358/461
7,119,926 B2 * 10/2006 Takeda et al. ............... 358/1.9
7,253,932 B2 * 8/2007 Tsutsumi ..................... 358/498

FOREIGN PATENT DOCUMENTS

| JP | 6-78147 | 3/1994 |
|---|---|---|
| JP | 2002-300391 | 10/2002 |
| JP | 2003-46773 | 2/2003 |

* cited by examiner

*Primary Examiner*—Houshang Safaipour
(74) *Attorney, Agent, or Firm*—Oblon, Spivak, McClelland, Maier & Neustadt, L.L.P.

(57) ABSTRACT

An image scanner includes a scanning unit that scans a white scanning member via a contact glass on one line basis when the image scanner is powered on and outputs image data of the white scanning member, and a determining unit that determines whether at least one of the contact glass and the white scanning member has dirt or a scratch thereon by comparing the image data with reference data on one line basis. The reference data is acquired by scanning the scanning member in a situation that there is no dirt or scratch on the scanning member.

6 Claims, 5 Drawing Sheets

IMAGE SCANNER AND IMAGE FORMING APPARATUS

CROSS-REFERENCE TO RELATED APPLICATIONS

The present document incorporates by reference the entire contents of Japanese priority documents, 2005-376702 filed in Japan on Dec. 27, 2005 and 2006-299473 filed in Japan on Nov. 2, 3006.

BACKGROUND OF THE INVENTION

1. Field of the Invention

The present invention generally relates to an image scanner and an image forming apparatus, and specifically relates to a sheetfed-type image scanner that employs a contact image sensor to scan a document.

2. Description of the Related Art

A typical contact image sensor includes a contact glass, a white scanning member, a unity-magnification imaging lens, and a scanning sensor. A document is conveyed between the contact glass, and the document is scanned while it passes between the contact glass and the white scanning member. The scanned image is focused on a scanning sensor via a unity-magnification imaging lens arranged near the contact glass.

However, if there is dust or dirt on the contact glass or the white scanning member, a noise occurs in the scanned image. Japanese Patent Application No. 2003-46773 discloses a technique to solve this problem. According to this technique, it is determined, from the scanned image, whether there was dust or dirt on the contact glass or the white scanning member when the document was scanned. If there was dust or dirt on the contact glass or the white scanning member, data is created for correcting the noise in the scanned image due to the presence of the dust or dirt, and the scanned image is corrected by using the created data. The correction of the scanned image arising from the dust or dirt is called the shading correction.

However, noise can occur in the scanned image due to reasons other than the presence of dust or dirt on the contact glass or the white scanning member. For example, noise can occur in the scanned image due to inherent characteristics of the image scanner or due to aging of the image scanner.

SUMMARY OF THE INVENTION

It is an object of the present invention to at least partially solve the problems in the conventional technology.

According to an aspect of the present invention, an image scanner that scans a document sandwiched between a transparent contact glass and a white scanning member includes a storage unit that stores therein reference data obtained by scanning the white scanning member in a situation that there is no dirt on both the contact glass and the white scanning member; a scanning unit that scans the white scanning member via the contact glass by using a linear sensor on one line basis when the image scanner is powered on, and outputs image data of the white scanning member; and a determining unit that determines whether at least one of the contact glass and the white scanning member has dirt or a scratch thereon on one line basis based on the reference data stored in the reference-value storage unit and the image data output by the scanning unit those corresponding to each one line to be determined.

According to another aspect of the present invention, an image forming apparatus includes an image scanner that scans a document sandwiched between a transparent contact glass and a white scanning member. The image scanner includes a storage unit that stores therein reference data obtained by scanning the white scanning member in a situation that there is no dirt on both the contact glass and the white scanning member; a scanning unit that scans the white scanning member via the contact glass by using a linear sensor on one line basis when the image scanner is powered on, and outputs an image data of the white scanning member; and a determining unit that determines whether at least one of the contact glass and the white scanning member has dirt or a scratch thereon on one line basis based on the reference data stored in the reference-value storage unit and the image data output by the scanning unit those corresponding to each one line to be determined; and an output unit that outputs an image of a document scanned by the image scanner.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
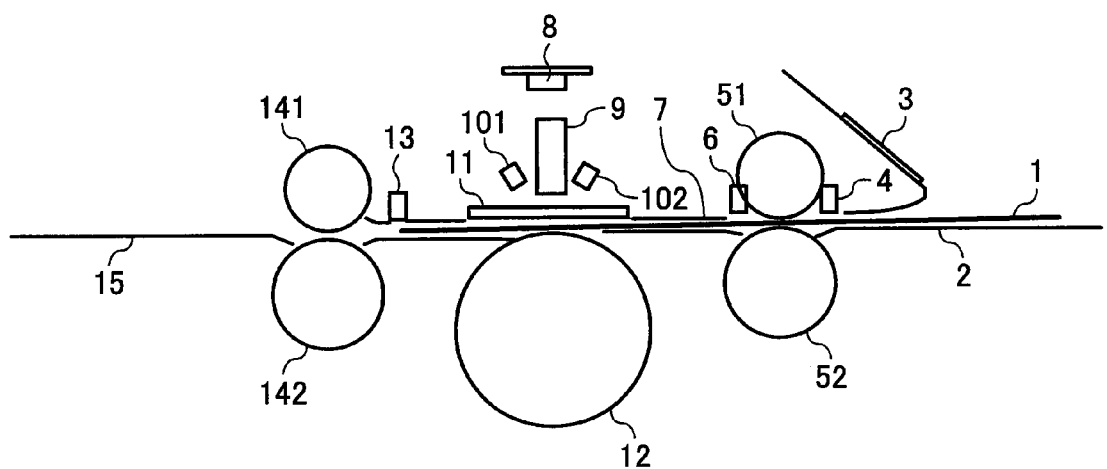
FIG. 1 is a side view of an image scanner according to an embodiment of the present invention.

FIG. 1 is a side view of an image scanner according to an embodiment of the present invention. The image scanner includes a document table 2, an operation/displaying unit 3, a document-insertion detecting sensor 4, document feeding rollers 51 and 52, a registration sensor 6, a plurality of guide plates 7, a linear sensor 8, a unity-magnification imaging-lens array 9, light sources 101 and 102, a contact glass 11, a white roller 12 as a white scanning member, a document-discharge detecting sensor 13, document discharging rollers 141 and 142, and a document receiving tray 15. A document 1 is placed on the document table 2. The linear sensor is a linearly-arranged scanning sensor such as linearly-arranged charge coupled devices (CCDs) or the like.

Figure 2:
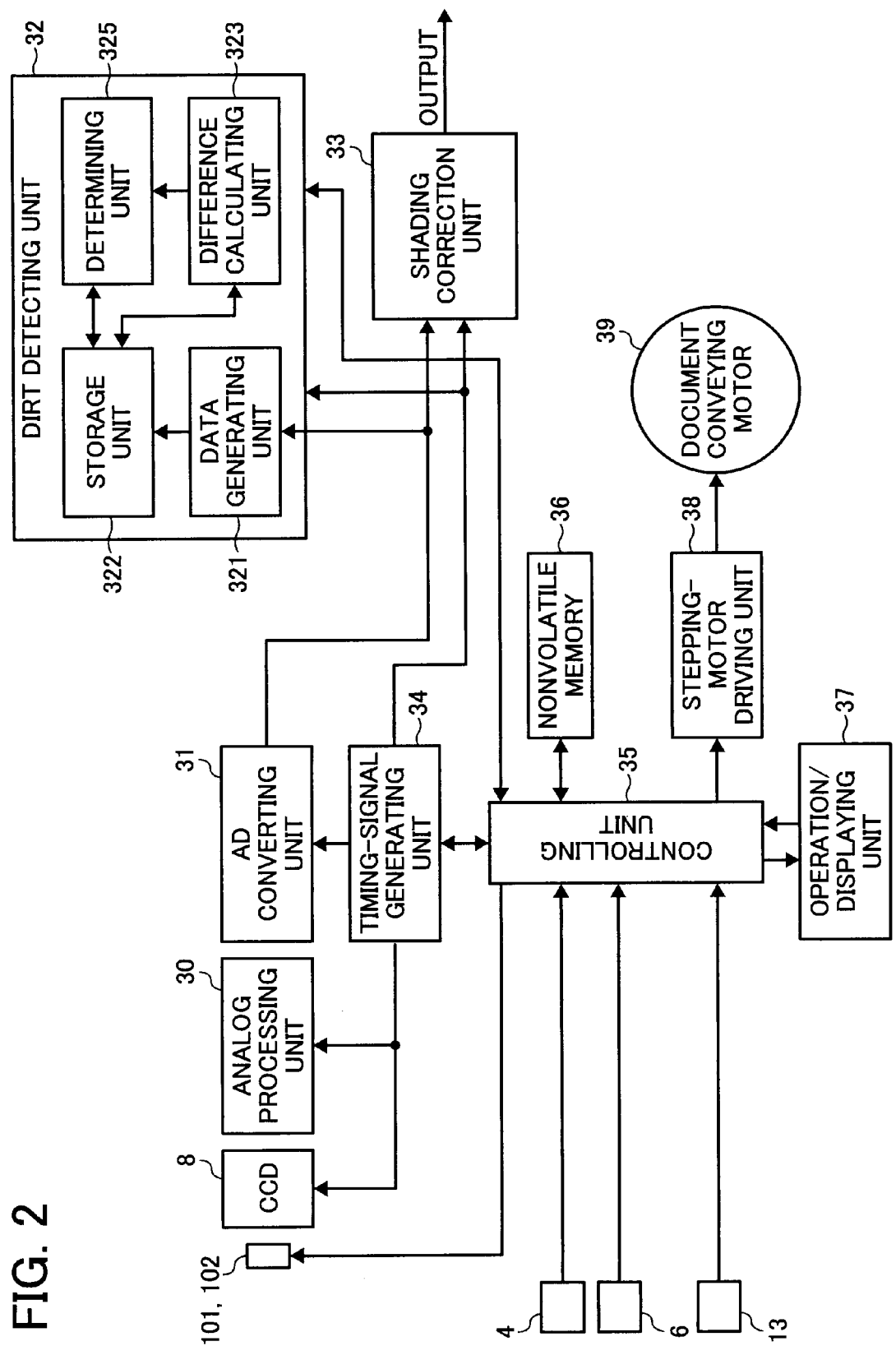
FIG. 2 is a block diagram of the image scanner.
Figure 3:
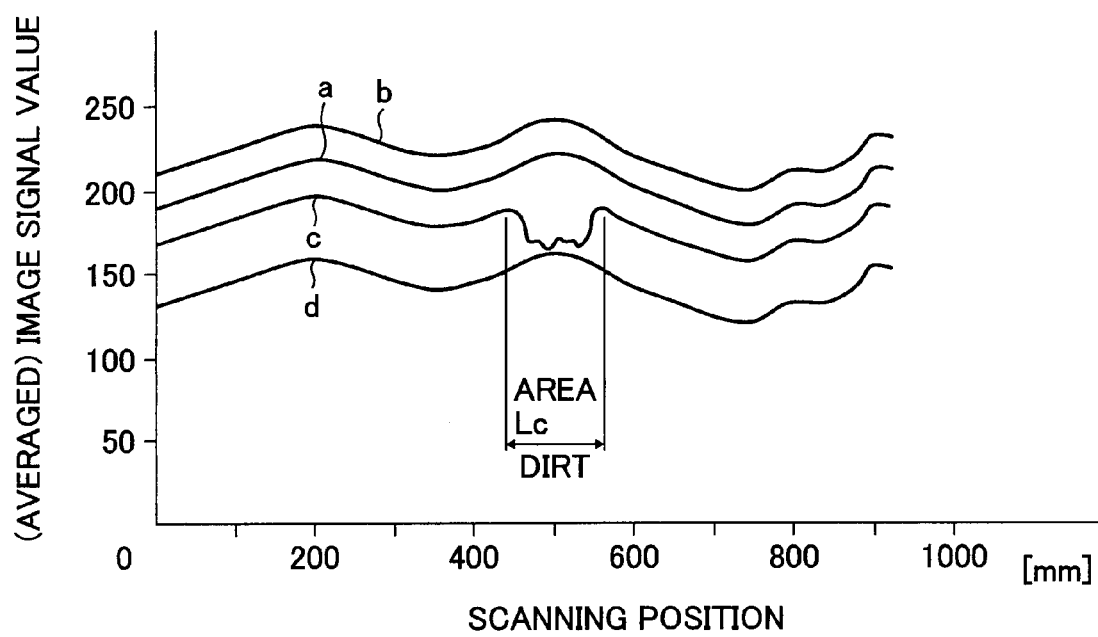
FIG. 3 is a graph of digital image signals acquired by the image scanner by scanning a white roller in a main scanning direction.
Figure 4:
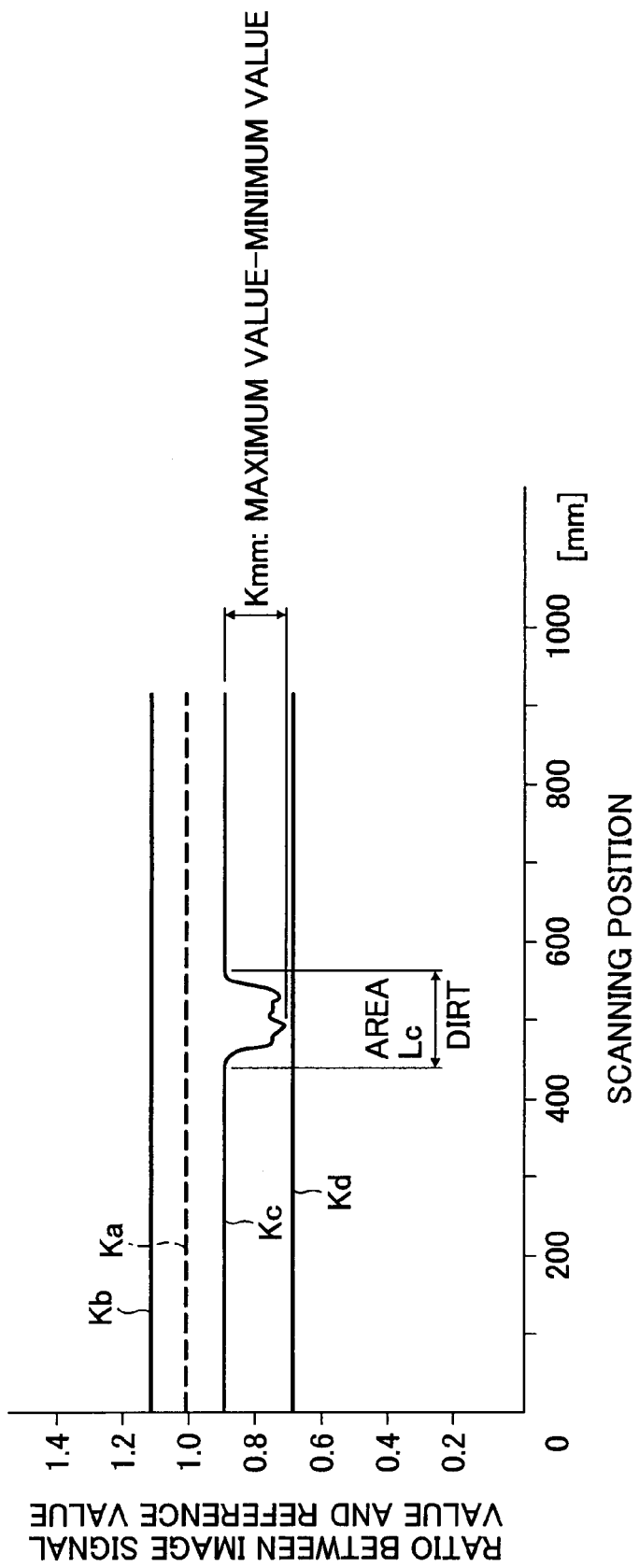
FIG. 4 is a graph of ratios between the digital image signals shown in FIG. 3 and reference data.

FIG. 2 is a block diagram of the image scanner. FIG. 3 is a graph of (averaged) scanned digital image signals acquired by the image scanner by scanning the white roller 12 in a main scanning direction. FIG. 4 is a graph of ratios between the digital image signals shown in FIG. 3 and reference data.

As shown in FIG. 2, the image scanner further includes an analog processing unit 30, an analog-to-digital (AD) converting unit 31, a dirt detecting unit 32, a shading correction unit 33, a timing-signal generating unit 34, a controlling unit 35, a nonvolatile memory 36, an operation/displaying unit 37, a stepping-motor driving unit 38, and a document conveying motor 39. The document conveying motor 39 can be a stepping motor.

Operations of the image scanner are described with reference to FIGS. 1 and 2. When the power of the image scanner is turned ON, the image scanner detects whether the contact glass 11 or the white roller 12 has dirt or dust thereon. The reference data used in detecting whether the contact glass 11 or the white roller 12 has dirt or dust thereon is acquired in advance.

The white roller 12 rotates with the rotation of the document conveying motor 39. The light sources 101 and 102 illuminate the document 1, which is being conveyed by the white roller 12, via the contact glass 11. The light reflected from the document 1 is focused on the linear sensor 8 via the unity-magnification imaging-lens array 9. In other words, an image of the document 1 is formed on the linear sensor 8, and the linear sensor 8 outputs an analog image signal indicative of the image. The dirt detecting unit 32 detects whether there is dirt or a scratch on the contact glass 11 or the white roller 12 from a signal obtained by AD conversion of the analog image signal output by the linear sensor 8.

Once the dirt detecting unit 32 finishes the detection of whether there is dirt or a scratch, the image scanner is ready to start scanning a document. Assume now that an operator of the image scanner puts the document 1 onto the document table 2 in a direction from right to left (in a forward direction) (see FIG. 1) so that the document-insertion detecting sensor 4 detects a tip of the document 1. When the document-insertion detecting sensor 4 detects the tip of the document 1, the light sources 101 and 102 are turned on, and the document conveying motor 39 starts operating. The document conveying motor 39 rotates the document feeding rollers 51 and 52, the white roller 12, and the document discharging rollers 141 and 142 in the forward direction. Because the document 1 is sandwiched between these rotating rollers, it is conveyed in the forward direction, and the registration sensor 6 detects the tip of the document 1.

The registration sensor 6 specifies a position of the tip of the document 1 in a conveying direction. Before the tip is conveyed to a scanning position that is located almost in the center of the white roller 12, the image scanner scans the white roller 12 via the contact glass 11 to create the data for shading correction. Then, an image carrying surface of the document 1 is scanned on one line basis sequentially. After being scanned, the document 1 is conveyed between the document discharging rollers 141 and 142 from the tip.

After the document-insertion detecting sensor 4 detects the tip of the document 1, the linear sensor 8 starts scanning consistently until a posterior end of the document 1 passes through the scanning position. When the tip of the document 1 is conveyed to the scanning position, the linear sensor 8 starts retrieving image data of the document 1. In addition, a position of the tip can be recognized by the number of the pulse signals input to the stepping-motor driving unit 38 with reference to a position of the registration sensor 6.

The number of the pulse signals is proportional to a rotation angle (the number of rotations) of the document conveying motor 39, i.e., a moving distance of the document 1. The document 1 is further conveyed in the forward direction, and discharged onto the document receiving tray 15. The light sources 101 and 102 are turned off, and the document conveying motor 39 stops. The document feeding rollers 51 and 52, the white roller 12, and the document discharging rollers 141 and 142 also stop rotating accordingly.

The analog processing unit 30 includes an amplifier. The amplifier adjusts a level of an analog image signal received by the linear sensor 8 (for example, a DC offset removal or the like), and changes a level of sample-and-hold circuit and gain. The AD converting unit 31 converts the analog image signal to an 8-bit digital image signal.

The dirt detecting unit 32 includes a data generating unit 321, a storage unit 322, a difference calculating unit 323, and a determining unit 325. The storage unit 322 can be a nonvolatile memory. The dirt detecting unit 32 generates the reference data and dirt-detecting data, and determines whether there is dirt or a scratch on the contact glass 11 or the white roller 12 based on the generated data.

The reference data is generated when the image scanner is manufactured or when both the contact glass 11 and the white roller 12 are just replaced with a new one, i.e., the reference data is generated when there is no dirt or a scratch on the contact glass 11 and the white roller 12.

A computer program that is necessary for generating the reference data is executed by an instruction from the operation/displaying unit 37 (as one of service programs). The light sources 101 and 102 are turned on, aid the linear sensor 8 scans the white roller 12 via the contact glass 11 to obtain an original image signal as the reference data, i.e., the image signal is obtained in a situation that there are no dirt or a scratch on both the contact glass 11 and the white roller 12. The linear sensor 8 constantly receives an analog image signal required for scanning. The AD converting unit 31 converts the analog image signal to digital image data. The data generating unit 321 included in the dirt detecting unit 32 generates the reference data base on the digital data.

The linear sensor 8 scans the white roller 12 on one line basis repeatedly (in the embodiment, total sixteen times). An image signal scanned at one time (in one line) includes 21,888 pixels in a main scanning direction times 16 pixels in a sub scanning direction. Therefore, by scanning the white roller 12 in the main scanning direction repeatedly, the white roller 12 is also scanned in the sub scanning direction. The data generating unit 321 calculates an average image signal of 16 pixels in the sub scanning direction included in each 1 pixel in the main scanning direction. Therefore, the data generating unit 321 obtains total 21,888 average image signals of 16 pixels in the sub scanning direction per one line. The average image signals are stored in the storage unit 322.

Of the 21,888 average image signals per one line stored in the storage unit 322, 16 data is extracted and averaged. Therefore, the image signals are smoothed by each 16 square pixels. When the document 1 is scanned at 600 dots per inch (dpi), a length of 16 pixels (in one line) is approximately 0.7 millimeter (mm). Namely, an average density of the image signal can be obtained at approximately 0.7 mm wide each. Thus, dirt or a scratch can be detected almost certainly by averaging (smoothing) the image signal data. Furthermore, it is possible to prevent an occurrence of noise on a scanned image.

More specifically, the method of generating the reference data is described below. The data generating unit 321 includes an adder and a register with an enough capacity for 16 (added 16 numbers of 1 byte data) times 21,888 bits. The data generating unit 321 adds 16 numbers of 1 byte data in the sub scanning direction included in each 1 pixel of the 21,888 pixels in the main scanning direction per one line, and divided by 16 (calculates an average value of the 16 data), and then obtains total 21,888 numbers of average values "Dan" (n=1, 2, . . . , 21888) of 16 pixels in the sub scanning direction. Dan data is stored in the storage unit 322.

The data generating unit 321 extracts data Da1 to Da16 from the storage unit 322. The data of Da1 to Da16 are added by the adder, and divided by 16 to obtain an average Ds1. In the same manner as above, data Da2 to Da17 are extracted from the storage unit 322, and added by the adder, and then divided by 16 to obtain Ds2. Last of all, Ds21873 is obtained by a following expression:

$$Ds21873=(Da21873+Da21874+\ldots+Da21888)/16$$

$$Dsm(m=1, 2, \ldots, 21873)$$

Dsm data is stored in a nonvolatile random access memory (NVRAM) included in the storage unit 322 as the reference data, and used to detect dirt or scratches.

The reference data is calculated from image signals including 21,888 pixels in the main scanning direction times 16 pixels in the sub scanning direction per one line, and stored in the storage unit 322. The reference data is used repeatedly to detect dirt or scratches. Therefore, a capacity of the storage unit 322 can be saved efficiently.

A method of generating dirt-detecting data is described below. This method is similar to the method of generating the reference data, but the difference between the methods is the timing to generate data. When the image scanner is powered on, the dirt-detecting data is generated to determine whether the contact glass 11 or the white roller 12 has any dirt or scratches thereon. In the embodiment, the dirt-detecting data is generated when the image scanner is powered on, but the timing of generating the dirt-detecting data can be changed, for example, whenever a document is inserted into the document table 2. The dirt-detecting data "Ddm" (m=1, 2, . . . , 21873) is generated in the same manner as the data Dsm. FIG. 3 is a graph of the reference data "a" and the image signal data "b", "c", and "d". Levels of the data b, c, and d are entirely different from the same of the reference data A due to aging changes of light sources, a circuit gain, or the like. As shown in FIG. 3, it is determined that there is dirt or scratches on an area Lc in the data c.

A method of determining dirt or scratches is described below. FIG. 4 is a graph of ratios "Km" between the reference data Dsm and the dirt-detecting data Ddm. The ratios are obtained by a following expression:

$$Km=Ddm/Dsm(m=1, 2, \ldots, 21873)$$

In FIG. 4, Ka, Kb, Kc, and Kd depict Km (m=a, b, c, and d) corresponding to the data a, b, c, and d in FIG. 3 respectively.

The difference calculating unit 323 calculates a difference "Kmm" between a maximum value "Kmax" and a minimum value "Kmin" of the ratios Ka, Kb, Kc, and Kd respectively. A calculated result is stored in the storage unit 322. As shown in FIG. 4, the data Kb, Kd, and Kc excluding the area Lc remain at a constant ratio with respect to the reference data Ka. However, the data Kc on the area Lc is significantly different from other areas. Therefore, the area Lc is determined that there is dirt thereon. The determining unit 325 determines whether there is dirt or a scratch by comparing Kmm retrieved from the storage unit 322 with a threshold "Ks" that is stored in the controlling unit 35 in advance. The threshold Ks is to be set, for example, within the range of 0.2 to 0.3, so that a noise can be distinguished from dirt or a scratch.

Kmm≧Ks There is dirt or a scratch.

K m<Ks There is no dirt or a scratch.

The operation/displaying unit 37 displays a determined result obtained by the determining unit 325. In addition, it is possible that the operation/displaying unit 37 also displays a location of dirt or a scratch if dirt or a scratch is detected.

The shading correction unit 33 corrects a fluctuation of the light intensity distribution of the light sources 101 and 102 in the main scanning direction, and also corrects a fluctuation of image signals in the main scanning direction due to an output characteristic from the linear sensor 8 to the AD converting unit 31. The timing-signal generating unit 34 provides a clock signal, a timing signal, an address, or data to the linear sensor 8, the analog processing unit 30, the AD converting unit 31, the dirt detecting unit 32, and the shading correction unit 33 when needed. The controlling unit 35 can adjust a timing and a value to be provided.

The controlling unit 35 includes a central processing unit (CPU), a random access memory (RAM), a read-only memory (ROM), an input and out (I/O) device, a driver element, and the like, that have been not shown in the diagrams. The controlling unit 35 controls the light sources 101 and 102 to be turned on or off, and retrieves signals from the document-insertion detecting sensor 4, the registration sensor 6, and the document-discharge detecting sensor 13, and also controls the document conveying motor 39 to drive via the stepping-motor driving unit 38. The operation/displaying unit 37 displays an input key to run the computer program for generating the reference data, and a caution if there is dirt or any other failure.

The nonvolatile memory 36 holds information about a location of the document 1 that is obtained when data scanned by the white roller 12 is adjusted. In addition, an actual image scanner generally performs a black correction, but a description and a drawing of the black correction are omitted because of no direct relevance to the present invention.

Figure 5:
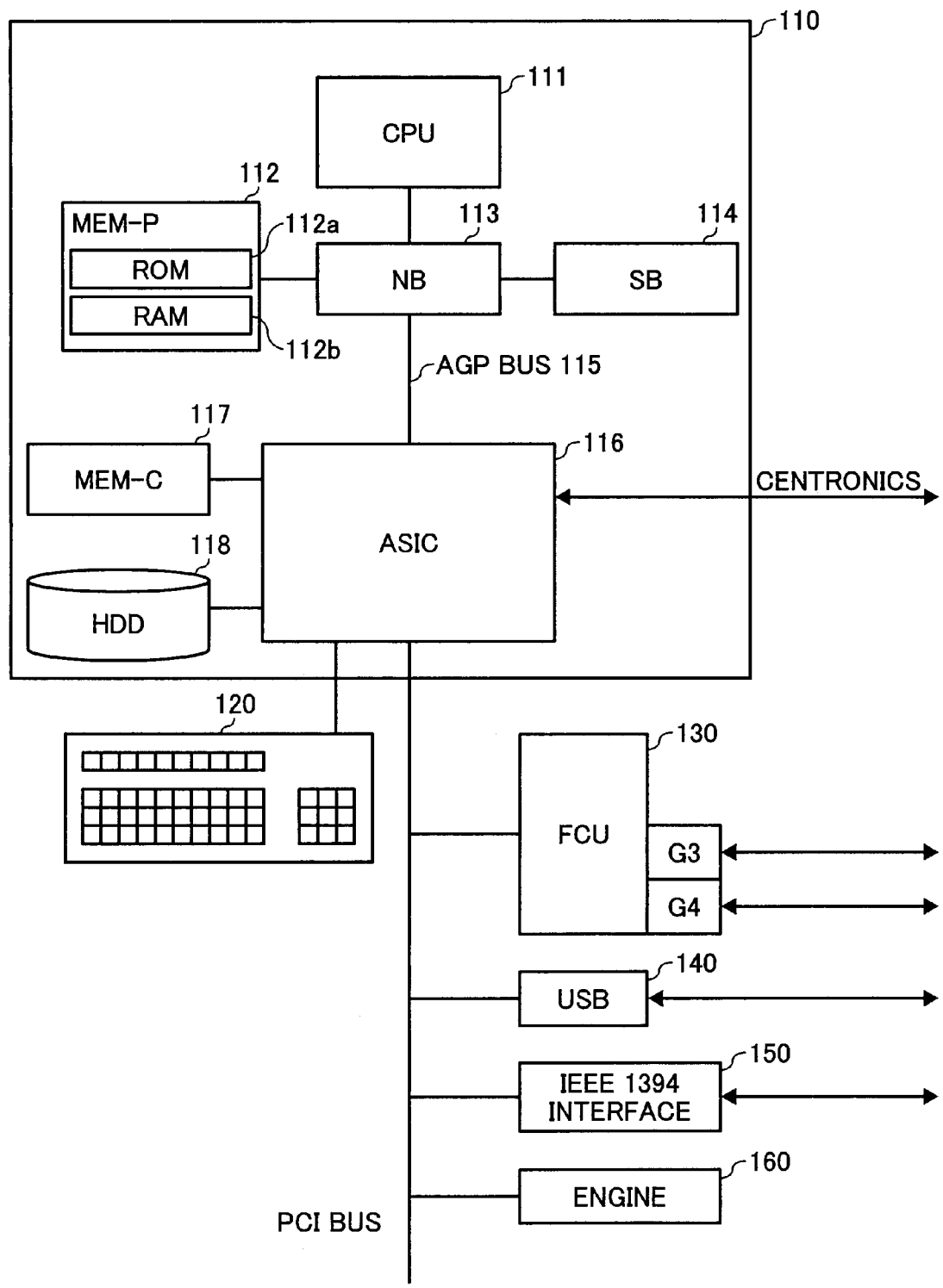
FIG. 5 is a schematic for explaining a hardware configuration of an image forming apparatus that includes the image scanner.

According to the embodiment, whether there is dirt is determined by comparing the difference between the maximum value and the minimum value of the image signal with the threshold. It is also possible to determine by superposing the reference data a and the data c in FIG. 3 and calculating a difference between the data a and c. If the difference exceeds a threshold, it can be determined that there is dirt The image scanner according to the embodiment can be applied to an image scanning unit of an image forming apparatus. FIG. 5 is a schematic for explaining a hardware configuration of an image forming apparatus that includes the image scanner according to the embodiment. In the image forming apparatus, a controller 110 and an engine 160 are connected by a Peripheral Component Interconnect (PCI) bus. The controller 110 controls the entire image forming apparatus, and also controls a drawing function, a communication function, and an input from an operating unit 120. The engine 160 is a printer engine connectable to the PCI bus such as a black-and-white plotter, a one-drum color plotter, a four-drum color plotter, a scanner, or a facsimile unit. In addition, the engine 160 includes not only the printer engine such as the plotter as above, but also an image processing unit that performs an error diffusion, a gamma conversion, and the like.

The controller 110 includes a CPU 111, a north bridge (NB) 113, a system memory (MEM-P) 112, a south bridge (SB) 114, a local memory (MEM-C) 117, an Application Specific Integrated Circuit (ASIC) 116, and a hard disk drive (HDD) 118. The NB 113 and the ASIC 116 are connected by an Accelerated Graphics Port (AGP) bus 115.

The CPU 111 controls the entire image forming apparatus, and connects to other devices via a chip set consisting of the NB 113, the MEM-P 112, and the SB 114.

The NB 113 is a bridge for connecting the CPU 111 to the MEM-P 112, the SB 114, and the AGP bus 115. The NB 113 includes a memory controller that controls to read/write on the MEM-P 112, a PCI master, and an AGP target.

The MEM-P 112 includes a ROM 112a and a RAM 112b. The ROM 112a is a memory stored computer programs and data therein. The RAM 112b is a readable/writable memory that is used as a memory for expanding computer programs and data, or a memory for drawing in a printer.

The SB 114 is a bridge for connecting the NB 113 to a PCI device and peripheral devices. The SB 114 and the NB 113 are connected by the PCI bus. A network interface (I/F) unit connects to the PCI bus between the SB 114 and the NB 113.

The ASIC 116 is an Integrated Circuit (IC) for image processing including an image-processing hardware element. The ASIC 116 serves as a bridge among the AGP bus 115, the PCI bus, the HDD 118, and the MEM-C 117. The ASIC 116 includes a PCI target, an AGP master, an arbiter (ARB) that is a core of the ASIC 116, a memory controller for controlling the MEM-C 117, a plurality of Direct Memory Access Controller (DMAC) for rotating image data by the hardware logic, and a PCI unit that transfers data to the engine 160 via the PCI bus. The ASIC 116 connects to a Fan Control Unit (FCU) 130, a Universal Serial Bus (USB) 140, the Institute of Electrical and Electronics Engineers 1394 (IEEE 1394) interface 150, and the engine 160.

The MEM-C 117 is used as a copying image buffer and a code buffer. The HDD 118 stores image data, computer programs, font data, format data therein.

The AGP bus 115 is a bus interface for a graphics accelerator card that makes possible to process graphics at high speed by high throughput accessing to the MEM-P 112 direct.

According to an aspect of the present invention, it is possible to detect dirt or dust attached to the scanning back member and the contact glass accurately.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. an image scanner that scans a document sandwiched between a transparent contact glass and a white scanning member, the image scanner comprising:
    a scanning unit that scans the white scanning member via the contact glass by using a linear sensor on one line basis when the image scanner is powered on, and outputs image data of the white scanning member;
    a data generating unit that generates an average of a predetermined pixel data area around a pixel data out of pixel data that are scanned by the scanner, and repeats generating the average up to an amount of one line of pixels so as to generate one line of pixel data;
    a storage unit that stores therein a one line of the pixel data generated by the data generating unit as a reference data in a situation that there is no dirt on both the contact glass and the white scanning member;
    a calculating unit that calculates a ratio between the one line of the pixel data generated by the data generating unit and the reference data stored in the storage unit at a predetermined time; and
    a determining unit that determines whether at least one of the contact glass and the white scanning member has dirt or a scratch thereon based on a difference between a maximum value and a minimum value of the ratio calculated by the calculating unit and a threshold.

2. The image scanner according to claim 1, wherein the calculating unit calculates a ratio between an average of the reference data and an average of the image data in 16 square pixels.

3. The image scanner according to claim 1, wherein the determining unit determines that at least one of the contact glass and the white scanning member has dirt or a scratch thereon if the difference is larger than the threshold.

4. The image scanner according to claim 1, further comprising an informing unit that informs a fact that there is dirt or a scratch on at least one of the contact glass and the white scanning member if the determining unit determines at least one of the contact glass and the white scanning member has dirt or a scratch thereon.

5. The image scanner according to claim 4, further comprising a displaying unit, wherein the informing unit informs the fact by displaying a message on the displaying unit.

6. An image forming apparatus comprising:
    an image scanner that scans a document sandwiched between a transparent contact glass and a white scanning member, the image scanner including
    a scanning unit that scans the white scanning member via the contact glass by using a linear sensor on one line basis when the image scanner is powered on, and outputs an image data of the white scanning member;
    a data generating unit that generates an average of a predetermined pixel data area around a pixel data out of pixel data that are scanned by the scanner, and repeats generating the average up to an amount of one line of pixels so as to generate one line of pixel data;
    a storage unit that stores therein a one line of the pixel data generated by the data generating unit as a reference data in a situation that there is no dirt on both the contact glass and the white scanning member;
    a calculating unit that calculates a ratio between the one line of the pixel data generated by the data generating unit and the reference data stored in the storage unit at a predetermined time;
    a determining unit that determines whether at least one of the contact glass and the white scanning member has dirt or a scratch thereon based on a difference between a maximum value and a minimum value of the ratio calculated by the calculating unit and a threshold; and
    an output unit that outputs an image of a document scanned by the image scanner.

* * * * *